US008657032B2

(12) United States Patent
Numata

(10) Patent No.: US 8,657,032 B2
(45) Date of Patent: Feb. 25, 2014

(54) ELECTRIC TOOL

(75) Inventor: Fumitoshi Numata, Anjo (JP)

(73) Assignee: Makita Corporation, Anjo-shi (JP)

( * ) Notice: Subject to any disclaimer, the term of this patent is extended or adjusted under 35 U.S.C. 154(b) by 474 days.

(21) Appl. No.: 13/018,964

(22) Filed: Feb. 1, 2011

(65) Prior Publication Data

US 2011/0220378 A1 Sep. 15, 2011

(30) Foreign Application Priority Data

Mar. 9, 2010 (JP) ................................ 2010-052150

(51) Int. Cl.

*B23Q 5/00* (2006.01)
*E21B 3/00* (2006.01)
*E21B 17/22* (2006.01)
*E21B 19/16* (2006.01)
*E21B 19/18* (2006.01)

(52) U.S. Cl.
USPC ........................................... 173/217; 173/156

(58) Field of Classification Search
USPC .......... 173/213–222, 164–167, 171, 141, 156
See application file for complete search history.

(56) References Cited

U.S. PATENT DOCUMENTS 4,807,061 A * 2/1989 Yoon .......................... 242/355.1
4,951,164 A * 8/1990 Yasaka et al. .................. 360/85
5,084,598 A * 1/1992 Nagata et al. ............... 200/16 C
6,644,420 B2 * 11/2003 Lay .............................. 173/178
7,055,283 B2 * 6/2006 Hsieh ............................. 49/139
7,438,207 B2 * 10/2008 Wu et al. ....................... 227/130
7,537,065 B2 * 5/2009 Gallagher et al. ............ 173/170
7,559,449 B2 * 7/2009 Viola ......................... 227/175.1
2006/0241655 A1 * 10/2006 Viola ............................ 606/142
2008/0275471 A1 * 11/2008 Viola ............................ 606/142
2010/0170931 A1 * 7/2010 Viola ......................... 227/175.1
2011/0078910 A1 * 4/2011 Tomita et al. .................. 30/381

FOREIGN PATENT DOCUMENTS

EP 1 938 924 A1 7/2008

* cited by examiner

*Primary Examiner* — Robert Long
(74) *Attorney, Agent, or Firm* — Oliff PLC

(57) ABSTRACT

An electric tool includes a housing accommodating a motor, and a break device and an operational member to turn on and turn off a drive switch of the motor. The brake device includes a brake plate fixed to an output shaft of the motor, a brake member is capable of moving toward and away from the brake plate during rotation, and an urging unit urging the brake member toward an abutment position where the brake member abuts on the brake plate. The operational member is provided with a press member that comes into abutment on the brake member through an operation of turning on the drive switch of the motor and rotates the brake member in such a rotational direction as to move away from the brake plate against the urging of the urging unit.

11 Claims, 9 Drawing Sheets

ELECTRIC TOOL

BACKGROUND OF THE INVENTION

This application claims the benefit of the Japanese Patent Application No. 2010-052150 filed on Mar. 9, 2010, the entirety of which is incorporated by reference in its entirety.

FIELD OF THE INVENTION

The present invention relates to an electric tool provided with a brake device having a brake member that can move toward and away from a brake plate fixed to an output shaft of a motor.

DESCRIPTION OF THE RELATED ART

For example, in European Patent Application Publication No. 1938924, there is disclosed an electric tool equipped with a device (a brake device) that brakes a drive shaft after a switch of the electric tool is turned off. In the brake device described in European Patent Application Publication No. 1938924, when the switch is turned off, a corresponding braking disk is pressed against a braking disk fixed to the drive shaft, due to an urging force of a spring. Thus, the drive shaft to which the braking disk is fixed can be stopped.

On the other hand, when a slider located on an upper face of a housing is manually operated to turn the aforementioned switch on, a rod-shaped coupling member coupled to the slider slides in an axial direction of the drive shaft. The coupling member slides in the axial direction, thereby pressing an upper end of an operational mechanism, which is joined to the corresponding braking disk in the axial direction, in the axial direction when cancelling the operation of the brake device. Thus, the operational mechanism is tilted perpendicularly to the axial direction. As the operational mechanism is tilted, the corresponding braking disk moves in the axial direction against the urging force of the aforementioned spring, and is released from the braking disk. Accordingly, the aforementioned drive shaft can be rotated.

However, as in the case of the aforementioned brake device, in order to release the corresponding braking disk from the braking disk in a manner interlocking with the manual operation of the slider, the moment of a force needed to tilt the operational mechanism increases correspondingly to the distance from a pivot shaft of the operational mechanism to an upper end thereof. Thus, a worker has to manually operate the slider with the force needed to tilt the operational mechanism in addition to a force surpassing the urging force of the spring. Thus, the worker does not find it easy to manually operate the slider, and sometimes feels stressed in performing an operation of cancelling the brake.

SUMMARY OF THE INVENTION

This invention has been proposed in consideration of such circumstances, and it is an object of the present invention to provide an electric tool that offers good operability by alleviating the burden by an operation of cancelling the brake.

According to an aspect of the present invention, there is provided an electric tool that includes a housing accommodating a motor, an operational member provided on the housing to turn on and turn off a drive switch of the motor, and a brake device provided in the housing. In this electric tool, the brake device includes a brake plate fixed to an output shaft of the motor, a brake member that can perform an operation of moving toward and away from the brake plate, and an urging unit that urges the brake member toward an abutment position where the brake member abuts on the brake plate. The brake member is so held in the housing as to perform the operation of moving toward and away from the brake plate during rotation. The operational member is provided with a press member that comes into abutment on the brake member through an operation of turning on the drive switch of the motor and rotates the brake member in such a rotational direction as to move away from the brake plate against urging of the urging unit.

In the foregoing aspect of the present invention, one of the housing and the brake member may be provided with a lead groove, the other may be provided with a pin that is loosely inserted in the lead groove, the lead groove and the pin may hold the brake member in the housing to thereby enable the operation of moving toward and away from the brake plate during rotation, and the lead groove may be formed such that the brake member comes into abutment on the brake plate in a rotational direction reverse to a rotational direction of the output shaft.

In the foregoing aspect of the present invention, the press member and the brake member may have abutment portions abutting on each other, one of the abutment portions being an inclined face. The inclined face may provide guidance to rotate the brake member when the press member and the brake member come into abutment on each other, and the other abutment portion guided by the inclined face may be a rolling body that rolls on the inclined face.

In the electric tool according to the foregoing aspect of the present invention, in order to move the brake member from the brake plate against the urging of the urging unit, the press member (the operational member) rotates the brake member in such a rotational direction as to move away from the brake plate. Thus, the moment of the force applied to the brake member is made smaller than before, and the force to be applied to the operational member by a worker can be reduced. Accordingly, good operability is ensured when the braking operation is canceled.

According to the first modified construction of the foregoing aspect of the present invention, in addition to the effect of the foregoing aspect of the present invention, with a simple structure utilizing the lead groove and the pin, the brake member can be caused to perform the operation of moving toward and away from the brake plate during rotation. In particular, when the brake member is brought into abutment on the brake plate by the urging unit, the brake member rotates reversely to the rotation of the brake plate due to the setting of the direction of the inclination of the lead groove. Therefore, the braking effect for the brake plate is enhanced.

According to the second modified construction of the foregoing aspect of the present invention, in addition to the aforementioned effects, when the rolling body rolls on the inclined face and the brake member rotates, the friction resistance of an abutment region between the rolling body and the inclined face is held low. Thus, the rolling body is not hindered from performing the operation of rolling on the inclined face. As a result, the operation of rotating the brake member can be smoothly performed.

BRIEF DESCRIPTION OF THE DRAWINGS

FIG. 7 is an illustrative view of a state in which a rolling body rolls with respect to an inclined face when a drive switch of a commutator motor is turned on;

DETAILED DESCRIPTION OF THE EMBODIMENT

Figure 1A:
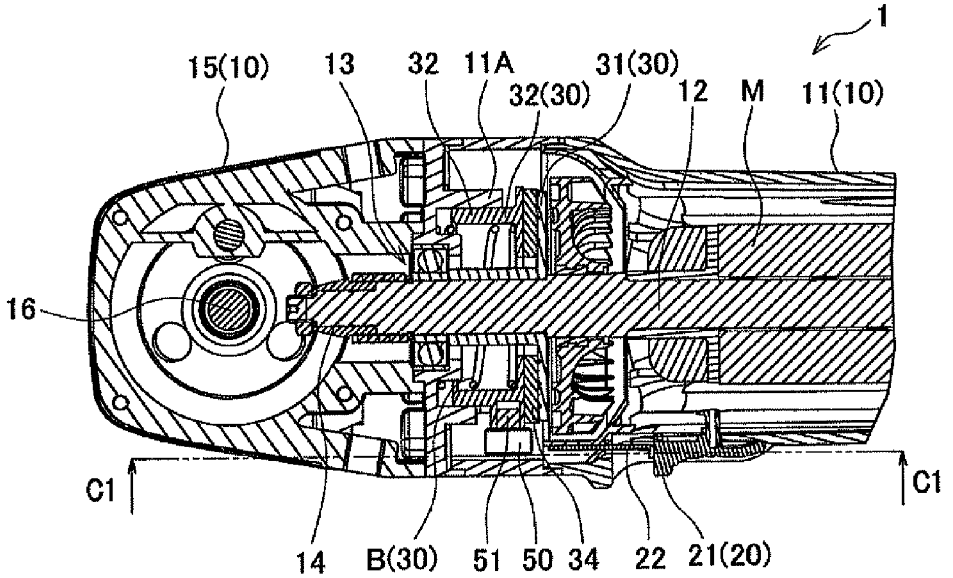
FIG. 1A is a transverse sectional view of an essential part of a grinding machine according to an embodiment of the present invention.

An embodiment of the present invention will be described with reference to FIGS. 1 to 9. As shown in FIGS. 1 to 3, a grinding machine 1 is equipped with a housing 10, a slide switch lever 20, and a brake device 30. It should be noted that the grinding machine 1 is an example of the electric tool according to the present invention.

The housing 10 is composed of a cylindrical motor housing 11 and a gear housing 15. A commutator motor M is accommodated in the motor housing 11. A rotor shaft 12 of the commutator motor M is rotatably supported in the motor housing 11 via a bearing 13. The rotor shaft 12 is sheathed at a tip thereof with a first bevel gear 14.

Figure 1B:
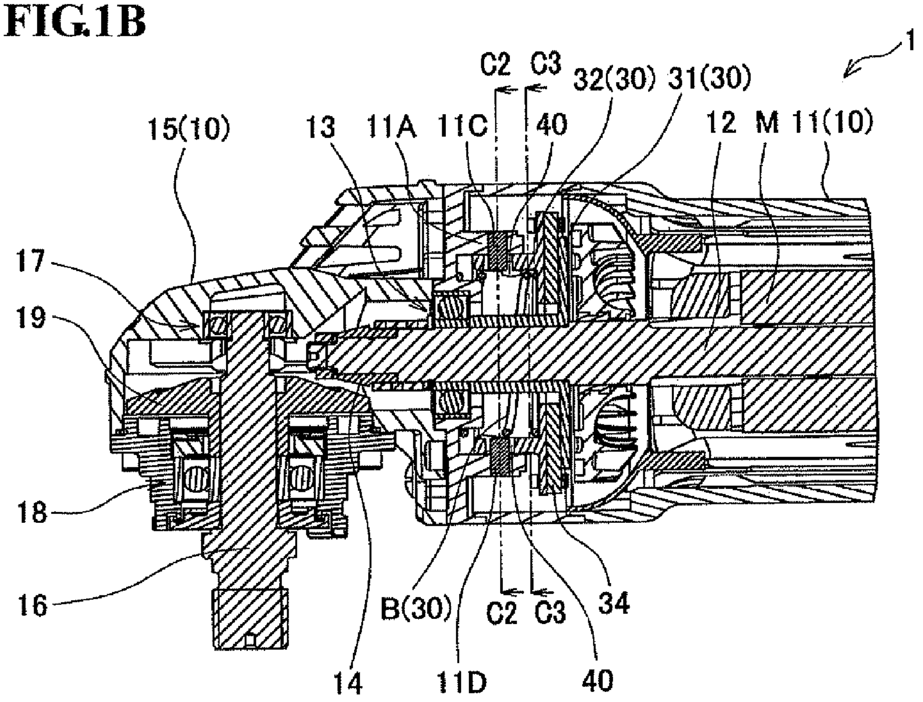
FIG. 1B is a longitudinal sectional view of an essential part of the grinding machine.
Figure 2:
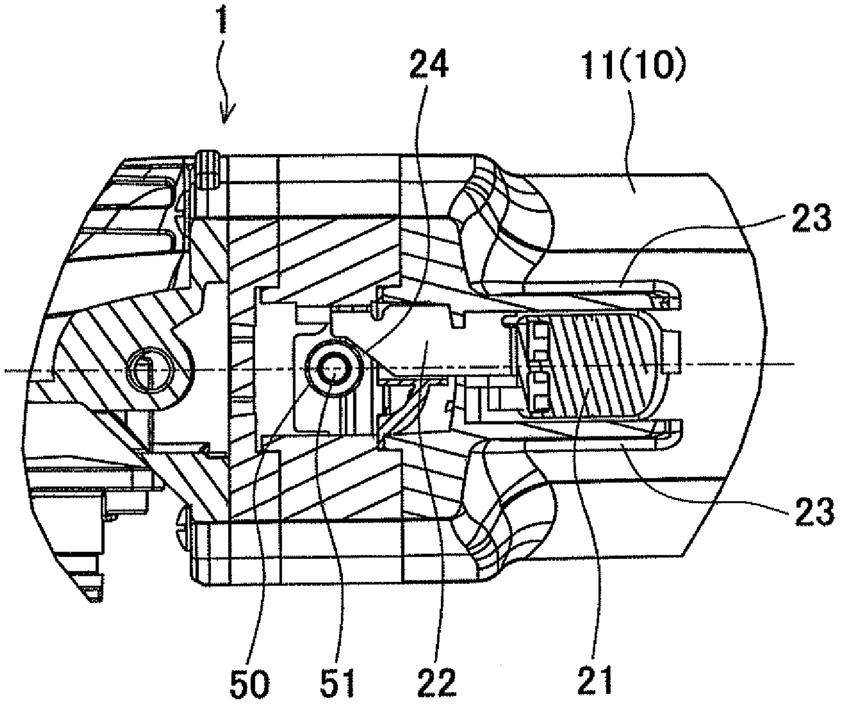
FIG. 2 is a partially enlarged view of the grinding machine of FIG. 1A in a direction of arrows C1-C1.

In the motor housing 11, an annular rib 11A of a cover member is protrusively provided in a longitudinal direction of the motor housing 11 (a lateral direction in FIGS. 1A and 1B). An upper shift pin 11C (see FIGS. 1A, 1B, 3A and 3B) is so fixed to the annular rib 11A as to protrude toward an axial center of the annular rib 11A. In addition, a lower shift pin 11D (see FIGS. 1A, 1B, 3A and 3B) is so fixed to the annular rib 11A as to protrude toward the axial center of the annular rib 11A at a position point-symmetrical to the upper shift pin 11C. The respective shift pins 11C and 11D are loosely inserted in lead grooves 40 and 40, which will be described later. It should be noted that the motor housing 11 is an example of the housing according to the present invention.

The gear housing 15 is assembled with a front region of the motor housing 11. As shown in FIGS. 1A and 1B, the aforementioned rotor shaft 12 protrudes from the motor housing 11 into the gear housing 15. In addition, a spindle 16 is rotatably supported perpendicularly to the rotor shaft 12 via bearings 17 and 18 in the gear housing 15. The spindle 16 is sheathed on an upper side thereof with a second bevel gear 19. The first bevel gear 14 meshes with the second bevel gear 19, so that rotation of the rotor shaft 12 is transmitted to the spindle 16. A disk-shaped whetstone (not shown) is attached to a lower end of the spindle 16. A ground material is ground by this disk-shaped whetstone.

As shown in FIG. 1A and FIG. 2, the slide switch lever 20 is composed of an operator 21 and a coupling bar 22. The operator 21 is provided along guides 23 and 23, which are provided on a lateral portion of the motor housing 11, slidably in a longitudinal direction of the motor housing 11 (in a lateral direction in FIG. 2). By sliding this operator 21, a drive switch (not shown) of the commutator motor M can be turned on and turn off. It should be noted that the slide switch lever 20 is an example of the operational member according to the present invention.

The coupling bar 22 is coupled to a tip of the operator 21. As shown in FIG. 2, an inclined face 24 so cut as to be inclined rightward and downward is formed on a tip side of the coupling bar 22. When sliding the operator 21 to thereby turn on the drive switch of the commutator motor M, the inclined face 24 can abut on the brake member 32 via a later-described rolling body 50.

The brake device 30 is provided to stop the spindle 16 by braking the rotor shaft 12 of the commutator motor M. As shown in FIGS. 1A and 1B, the brake device 30 has a brake plate 31, a brake member 32, and a coil spring B.

Figure 3A:
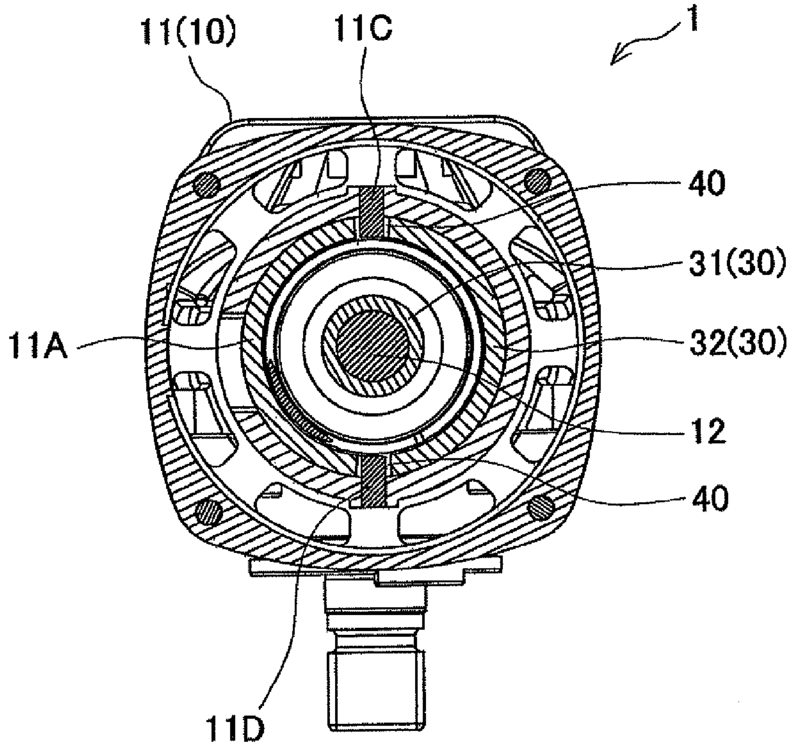
FIG. 3A is a view of the grinding machine of FIG. 1B in a direction of arrows C2-C2.
Figure 3B:
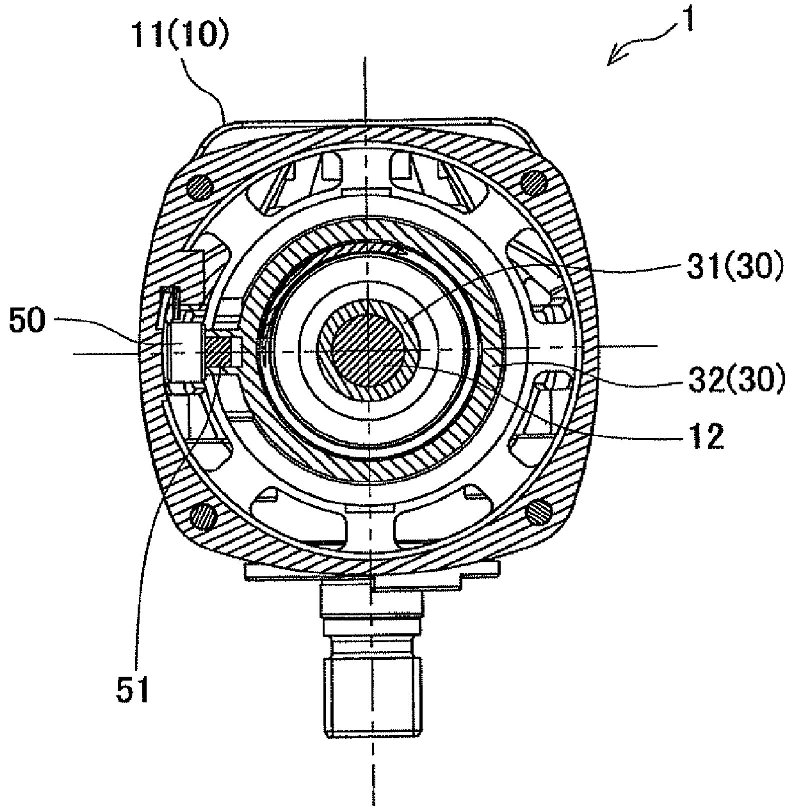
FIG. 3B is a view of the grinding machine of FIG. 1B in a direction of arrows C3-C3.
Figure 4A:
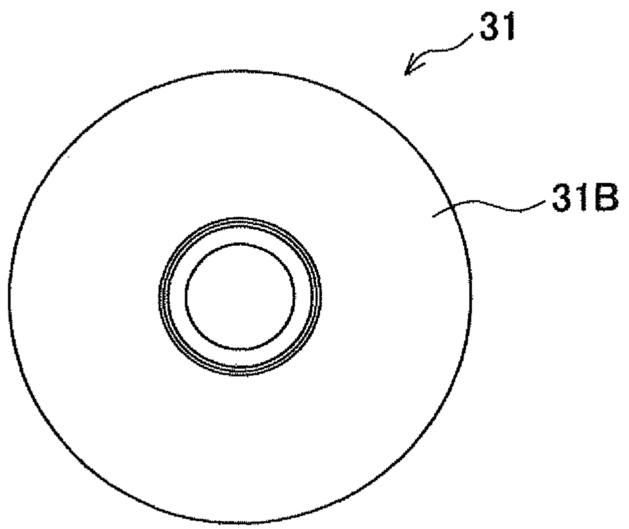
FIG. 4A is a front view of a brake plate with which the grinding machine is equipped.
Figure 4B:
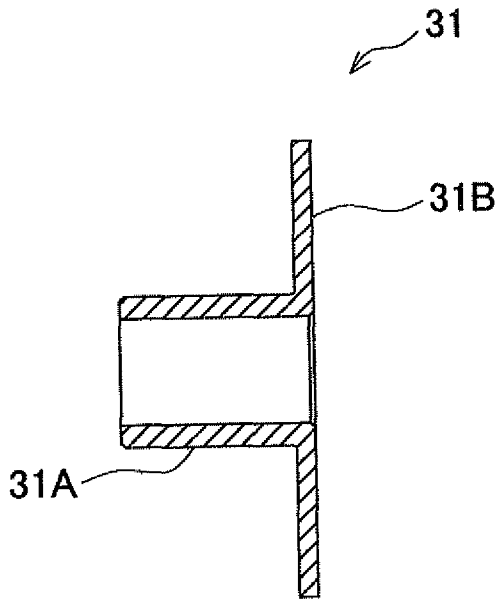
FIG. 4B is a longitudinal sectional view of the brake plate.

As shown in FIGS. 4A and 4B, the brake plate 31 is equipped with a cylinder portion 31A and a circular flange portion 31B. The cylinder portion 31A has a hollow structure, and is fitted to the rotor shaft 12. Thus, as shown in FIGS. 1A, 1B, 3A and 3B, the brake plate 31 is fixed to the rotor shaft 12. It should be noted that the rotor shaft 12 is an example of the output shaft of the motor according to the present invention.

As shown in FIGS. 5, 6A, 6B, 6C, the brake member 32 has a hollow cylinder portion and a circular plate portion. As shown in FIGS. 1A and 1B, the brake member 32 is held in the motor housing 11 via the annular rib 11A in front of the brake plate 31 in an axial direction of the rotor shaft 12. By being rotated, the brake member 32 can move toward and away from the brake plate 31. A brake shoe 34 (see FIGS. 1A and 1B) is fixed to a rear face (the circular plate portion) of the brake member 32 that is opposed to the brake plate 31.

The coil spring B is accommodated in the motor housing 11 to constantly urge the brake member 32 in a direction in which the brake member 32 comes into abutment on the brake plate 31. Thus, when turning off the drive switch of the commutator motor M, the aforementioned brake shoe 34 is pressed hard against the brake plate 31 due to an urging force of the coil spring B. Thus, the rotor shaft 12 and the spindle 16 can be stopped in a short time. It should be noted that the coil spring B is an example of the urging unit according to the present invention.

In this embodiment of the present invention, as shown in FIGS. 1 to 3 and FIGS. 5, 6A, 6B and 6C, the brake member 32 is equipped with the pair of the lead grooves 40 and 40 and the rolling body 50.

The lead grooves 40 and 40 are so formed in an outer periphery of a hollow cylinder portion of the brake member 32 as to have spiral inclines turning leftward toward a front region of the brake member 32. A direction of this left turn means a direction reverse to a rotational direction of the rotor shaft 12 (a direction of turning rightward toward the front region of the brake member 32). The shift pins 11C and 11D are loosely inserted in the lead grooves 40 and 40 respectively.

Figure 5:
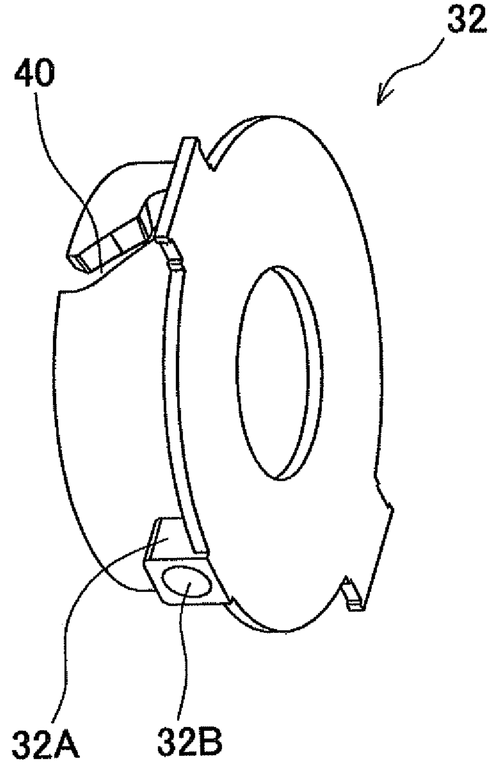
FIG. 5 is a perspective view of a brake member with which the grinding machine is equipped.
Figure 6A:
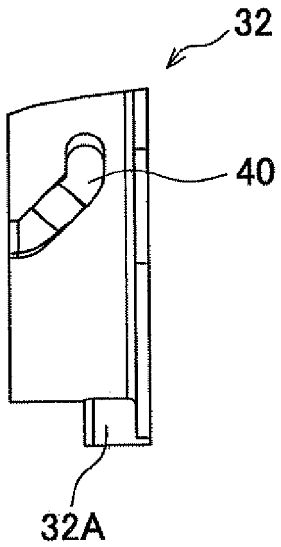
FIG. 6A is a top view of the brake member.
Figure 6B:
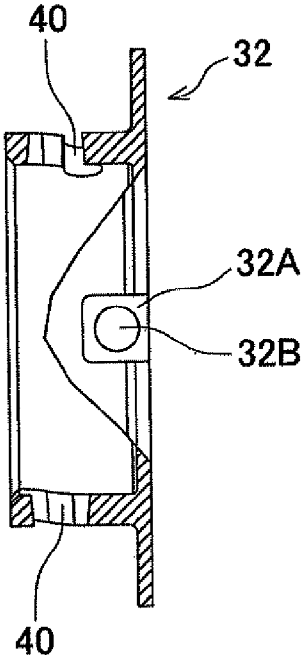
FIG. 6B is a longitudinal sectional view of an essential part of the brake member.
Figure 6C:
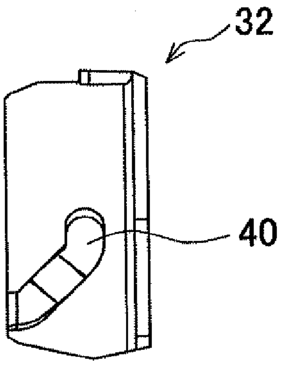
FIG. 6C is a bottom view of the brake member.

The rolling body 50 is axially supported by a pin 51 so as to be rotatable (see FIGS. 1 to 3) while protruding from an outer periphery of the hollow cylinder portion of the brake member 32 in a radial direction of the brake member 32. As shown in FIGS. 5 and 6B, a rectangular parallelepiped holder portion 32A is protrusively provided on the outer periphery of the hollow cylinder portion. The pin 51 is fixed to the holder portion 32A via a fitting hole 32B.

Figure 7:
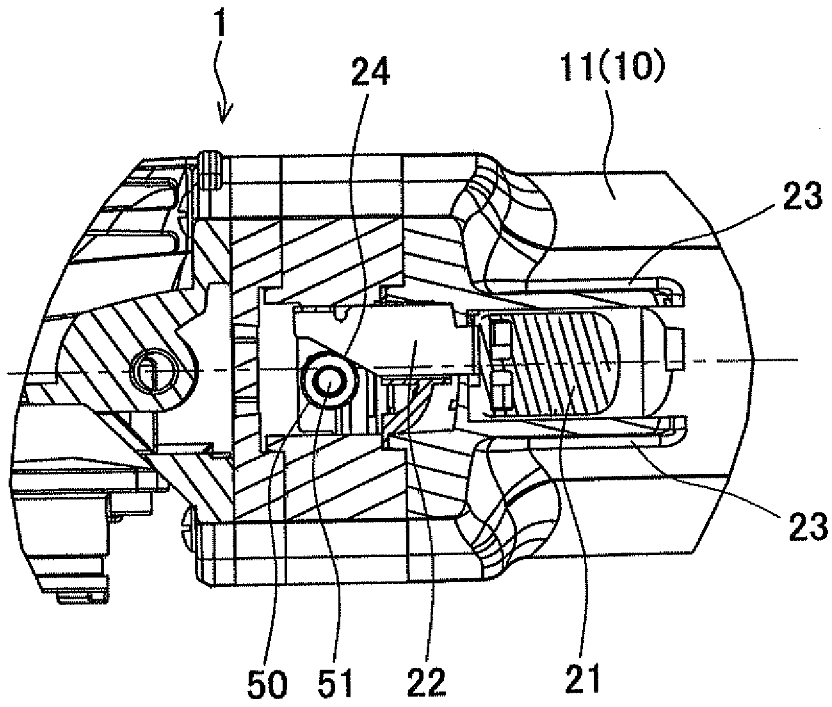

Next, an operation of cancelling the brake in such a manner as to interlock with the operation of turning on the drive switch of the commutator motor M by sliding the operator 21 forward will be described. When the drive switch of the commutator motor M is off, the brake member 32 is arranged at such a position that the brake shoe 34 abuts on the brake plate 31, and the shift pins 11C and 11D are located at front end sides of the lead grooves 40 and 40 respectively. When turning on the drive switch of the commutator motor M, a worker slides the operator 21 forward with respect to the motor housing 11 (leftward in FIG. 7) along the guides 23 and 23 shown in FIG. 7, from a state in which the drive switch of the commutator motor M shown in FIG. 2 is off. In this process, the coupling bar 22 slides forward as described above. Thus, as shown in FIG. 7, the rolling body 50 rolls with respect to the inclined face 24 while abutting thereon, thereby rotating the brake member 32 leftward.

Figure 8A:
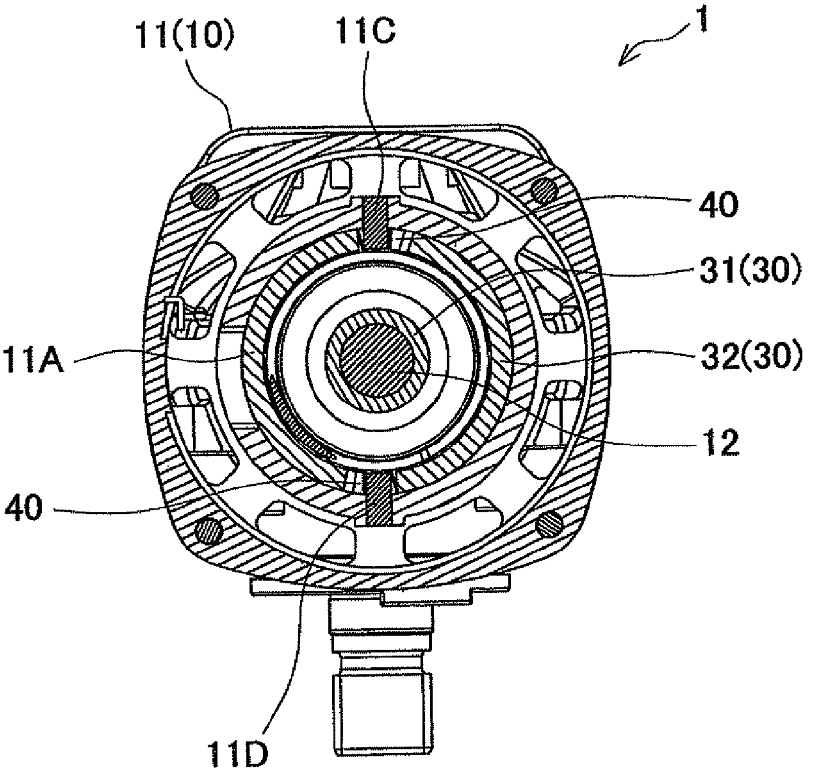
FIG. 8A is an illustrative view of a state in which pins are guided in lead grooves respectively when the brake member moves away from the brake plate.
Figure 8B:
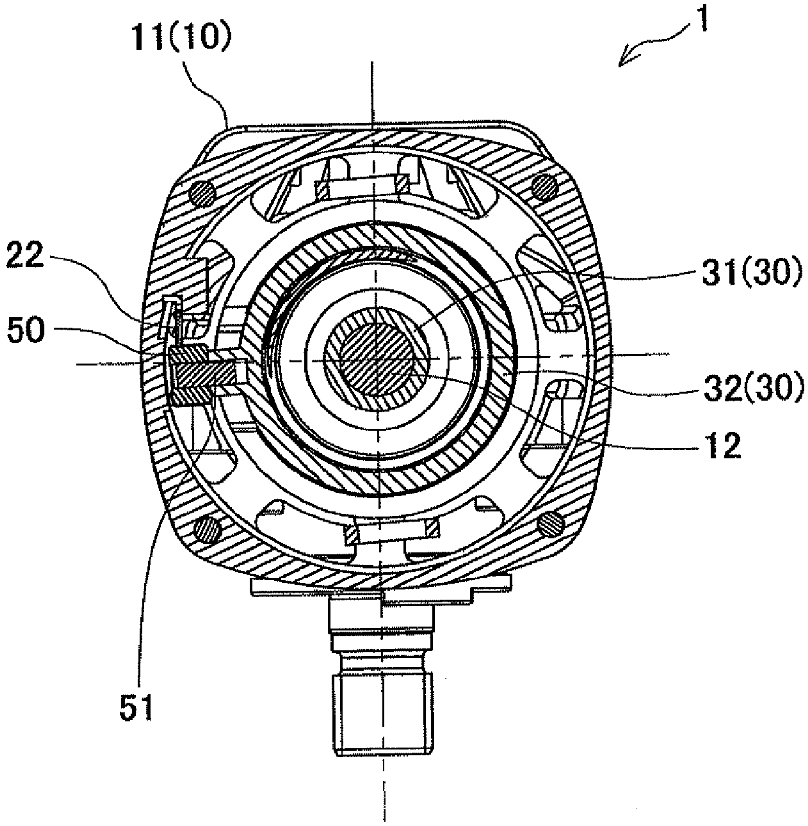
FIG. 8B is an illustrative view of a state in which the rolling body is pressed down by the inclined face.

At this moment, as shown in FIG. 3A and FIG. 8A, the shift pins 11C and 11D relatively slide in the lead grooves 40 and 40 respectively. Thus, the brake member 32 advances against an urging force of the coil spring B while being held in the motor housing 11.

Figure 9A:
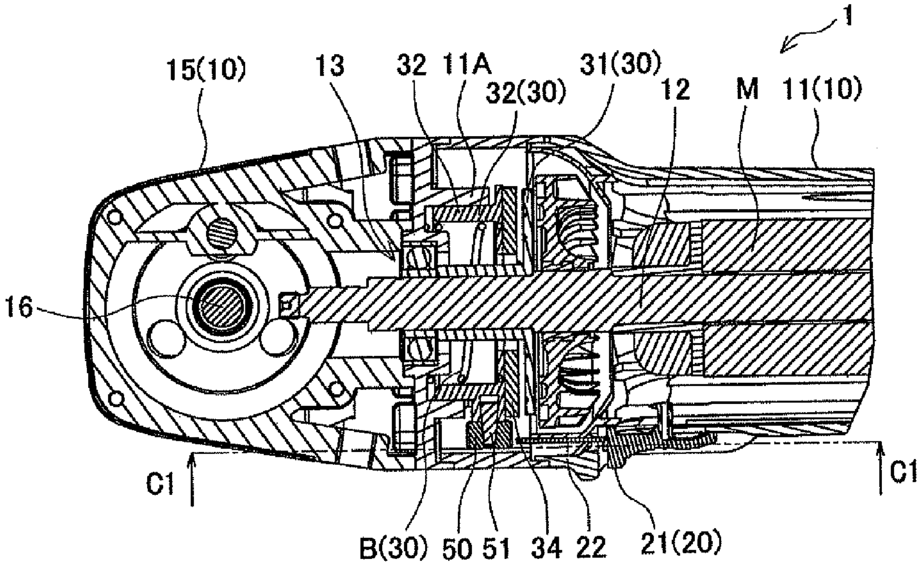
FIG. 9A is a transverse sectional view of the essential part of the grinding machine showing a state in which the brake member has moved away from the brake plate.
Figure 9B:
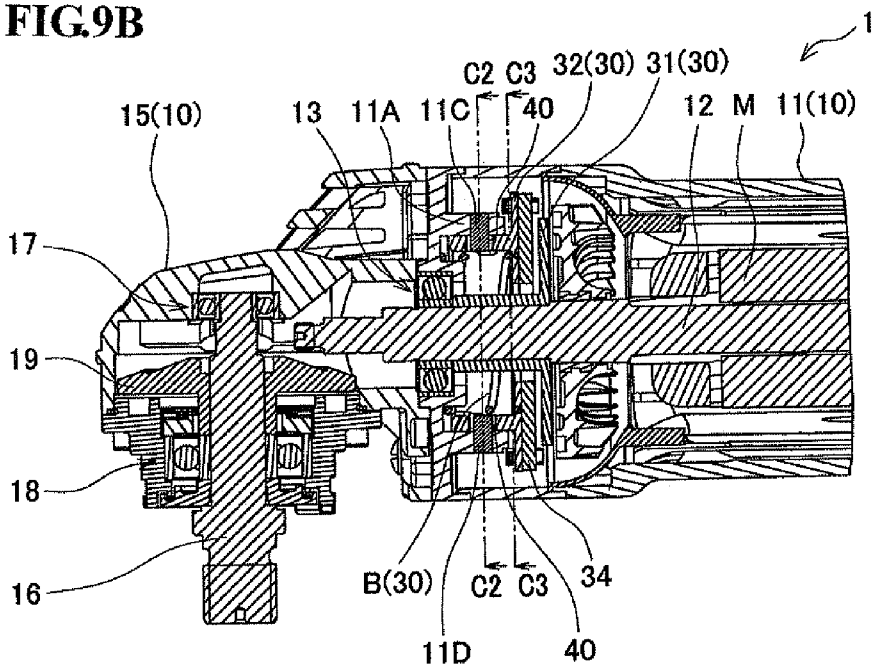
FIG. 9B is a longitudinal sectional view of the essential part of the grinding machine showing a state in which the brake member has moved away from the brake plate.

By rotating leftward, the brake member 32 moves away from the brake plate 31 as shown in FIGS. 9A and 9B. Accordingly, the brake shoe 34 fixed to the brake member 32 also moves away from the brake plate 31 and hence is not pressed against the brake plate 31. Thus, the braking operation of the device 30 is cancelled. It should be noted that the coupling bar 22 having the inclined face 24 formed thereon is an example of the press member according to the present invention.

On the other hand, when the worker slides the operator 21 backward to turn off the drive switch of the commutator motor M, the brake member 32 that has been stopped from being pressed by the coupling bar 22 retreats toward the brake plate 31 due to the urging force of the coil spring B. At this moment, by being guided by the lead grooves 40 and 40 in which the shift pins 11C and 11D slide respectively, the brake member 32 is held in the motor housing 11, retreats while rotating rightward as opposed to the case of turning on the drive switch of the commutator motor M, and presses the brake shoe 34 against the brake plate 31. In consequence, a braking force is applied to the brake plate 31, and the rotor shaft 12 immediately stops rotating.

EFFECT OF THIS EMBODIMENT OF THE PRESENT INVENTION

In the grinding machine 1 according to this embodiment of the present invention, the brake member 32 is so held in the motor housing 11 as to move toward or away from the brake plate 31 during rotation. When turning on the drive switch of the commutator motor M, the coupling bar 22 of the slide switch lever 20 is brought into abutment on the brake member 32 via the rolling body 50, and the brake member 32 is rotated away from the brake plate 31 (in the left turn direction). Thus, the brake member 32 is rotated leftward by the coupling bar 22 to move the brake member 32 away from the brake plate 31 against the urging force of the coil spring B, and the moment of a force applied to the brake member 32 is thereby made smaller than when the brake member 32 is tilted perpendicularly to the axial direction thereof. Thus, when moving the brake member 32 away from the brake plate 31, the force to be applied to the operator 21 by the worker can be reduced. As a result, good operability is ensured when cancelling the operation of the brake device 30.

Further, the brake member 32 is rotated by being held in the motor housing 11 by the lead grooves 40 and 40 formed on the outer periphery of the brake member 32 and the respective shift pins 11C and 11D fixed to the annular rib 11A, and is thereby caused to move toward and away from the brake plate 31. Thus, with a simple structure utilizing the lead grooves 40 and 40 and the respective shift pins 11C and 11D, the brake member 32 can move toward and away from the brake plate 31. In addition, when bringing the brake shoe 34 into abutment on the brake plate 31 through the coil spring B, the brake member 32 rotates rightward as opposed to the case of turning on the drive switch of the commutator motor M, due to the setting of the direction of the inclination of the lead grooves 40 and 40. Therefore, a large braking force can be applied to the brake plate 31.

Furthermore, when the coupling bar 22 and the brake member 32 come into abutment on each other, the rolling body 50 of the brake member 32 is rolled with respect to the inclined face 24 of the coupling bar 22 to rotate the brake member 32. Thus, owing to the use of the rolling body 50, the friction resistance in an abutment region between the rolling body 50 and the inclined face 24 is held low. As a result, the operation of rotating the brake member 32 can be smoothly performed.

The present invention is not limited to the foregoing embodiment thereof, but can be carried out by appropriately modifying part of the construction thereof without departing from the scope of the present invention. For example, unlike the foregoing embodiment of the present invention, pins identical to the respective shift pins 11C and 11D may be protrusively provided, instead of the lead grooves 40, on the outer periphery of the hollow cylinder portion of the brake member 32, and grooves identical to the lead grooves 40 may be formed, instead of the respective shift pins 11C and 11D, in the annular rib 11A. In addition, unlike the foregoing embodiment of the present invention, the lead grooves may be formed in a recessed manner in the outer periphery of the hollow cylinder portion of the brake member 32 without radially penetrating the brake member 32. Furthermore, unlike the foregoing embodiment of the present invention, the brake member 32 may be rotated by screwing spiral protrusion strips into grooves, instead of utilizing the respective shift pins 11C and 11D and the lead grooves 40 and 40.

Further, in the foregoing embodiment of the present invention, in order to rotationally move the brake member 32 in the axial direction thereof; the inclined face 24 is formed on the coupling bar 22 of the slide switch lever 20, and the rolling body 50 is axially supported on the brake member 32. However, the present invention is not limited to this construction. For example, it is also appropriate to rotationally move the brake member 32 in the axial direction thereof by forming an inclined face on the brake member 32 and rotatably providing the coupling bar 22 with a rolling body. Besides, it is also appropriate to rotationally move the brake member 32 by forming inclined faces on both the brake member 32 and the coupling bar 22 instead of employing the rolling body 50.

Furthermore, the foregoing embodiment of the present invention shows the example in which the present invention is applied to the grinding machine. However, the present invention is not limited to this example, but may be applied to electric tools such as a circular saw and the like.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An electric tool comprising:

a housing accommodating a motor;

an operational member provided on the housing to turn on and turn off a drive switch of the motor; and a brake device provided in the housing, wherein the brake device includes a brake plate fixed to an output shaft of the motor, a brake member that can perform an operation of moving toward and away from the brake plate, and an urging unit that urges the brake member toward an abutment position where the brake member abuts on the brake plate, wherein the brake member is held in the housing so as to perform the operation of moving toward and away from the brake plate, and the operational member is provided with a press member that comes into abutment on the brake member through an operation of turning on the drive switch of the motor and the press member rotates the brake member in such a rotational direction as to move the brake member away from the brake plate against urging of the urging unit.

2. The electric tool according to claim 1, wherein one of the housing and the brake member is provided with a lead groove, the other is provided with a pin that is loosely inserted in the lead groove, the lead groove and the pin hold the brake member in the housing to thereby enable the operation of moving toward and away from the brake plate during rotation, and the lead groove is formed such that the brake member comes into abutment on the brake plate in a rotational direction reverse to a rotational direction of the output shaft.

3. The electric tool according to claim 1, wherein the press member and the brake member have abutment portions abutting on each other, one of the abutment portions being an inclined face, the inclined face provides guidance to rotate the brake member when the press member and the brake member come into abutment on each other, and the other abutment portion guided by the inclined face is a rolling body that rolls on the inclined face.

4. The electric tool according to claim 2, wherein the press member and the brake member have abutment portions abutting on each other, one of the abutment portions being an inclined face, the inclined face provides guidance to rotate the brake member when the press member and the brake member come into abutment on each other, and the other abutment portion guided by the inclined face is a rolling body that rolls on the inclined face.

5. The electric tool according to claim 2, wherein the brake member has a hollow cylinder portion extending in a direction of the operation of moving toward and away from the brake plate, and a circular plate portion provided at an end of the hollow cylinder portion on the brake plate side, the housing is provided therein with an annular rib protruding in the direction of the operation of moving toward and away from the brake plate, so that the hollow cylinder portion is held in the housing via the annular rib, the pin is so fixed to the annular rib as to protrude toward an axial center of the annular rib, and the lead groove is formed in an outer periphery of the hollow cylinder portion.

6. The electric tool according to claim 5, wherein the housing is cylindrically formed, the pin forms a pair with another pin arranged point-symmetrically thereto with respect to a center of the housing, and the lead groove forms a pair with another lead groove arranged point-symmetrically thereto with respect to the center of the housing.

7. The electric tool according to claim 3, wherein the brake member has a hollow cylinder portion extending in a direction of the operation of moving toward and away from the brake plate, and a circular plate portion provided at an end of the hollow cylinder portion on the brake plate side, the inclined face is formed on the abutment portion of the press member, and the rolling body is so protruded from an outer periphery of the hollow cylinder portion as to be abuttable on the inclined face.

8. The electric tool according to claim 5 wherein the brake member has a brake shoe fixed to the circular plate portion.

9. The electric tool according to claim 7, wherein the outer periphery of the hollow cylinder portion has a holder portion protruding therefrom, the holder portion is provided with a fitting hole in which a support pin that rotatably supports the rolling body is fitted, and the rolling body is fixed to the holder portion by the support pin.

10. The electric tool according to claim 1, wherein the urging unit is a coil spring.

11. The electric tool according to claim 1, wherein the operational member is operated to be slid in a direction of moving toward and away from the brake plate to allow the drive switch to be turned on and turned off, and the housing is provided with a guide that guides an operation of sliding the operational member.

* * * * *